(12) United States Patent
Wang et al.

(10) Patent No.: US 11,316,351 B2
(45) Date of Patent: Apr. 26, 2022

(54) POWER BRIDGE DEVICE USING MOBILE ROBOT BATTERY

(71) Applicant: WEIDA HI-TECH CORPORATION LTD., Hsinchu (TW)

(72) Inventors: Jen-Chuan Wang, Hsinchu (TW); Zi-Huan Luo, Taoyuan (TW)

(73) Assignee: WEIDA HI-TECH CORPORATION LTD., Hsinchu (TW)

( * ) Notice: Subject to any disclaimer, the term of this patent is extended or adjusted under 35 U.S.C. 154(b) by 0 days.

(21) Appl. No.: 16/832,733

(22) Filed: Mar. 27, 2020

(65) Prior Publication Data

US 2020/0313448 A1    Oct. 1, 2020

(30) Foreign Application Priority Data

Mar. 29, 2019    (TW) .................................. 108111172

(51) Int. Cl.
    *H02J 7/00*        (2006.01)
(52) U.S. Cl.
    CPC ........ *H02J 7/00036* (2020.01); *H02J 7/0042* (2013.01); *H02J 7/0068* (2013.01)
(58) Field of Classification Search
    CPC ........ H02J 9/02; H02J 7/00036; H02J 7/0068; H02J 7/0042; H02J 7/342; H02J 7/0048; H02J 7/0063; H02J 7/00034; H02J 7/007; H02J 7/0045; Y02B 10/70
    See application file for complete search history.

(56) References Cited

U.S. PATENT DOCUMENTS

| | | | | |
|---|---|---|---|---|
| 5,900,717 A | * | 5/1999 | Lee ....................... | H02J 7/0091 320/150 |
| 7,484,109 B2 | * | 1/2009 | Feldman .................. | G06F 1/28 713/300 |
| 7,573,228 B2 | * | 8/2009 | Karner .................. | H02J 7/0068 320/104 |
| 7,982,342 B2 | * | 7/2011 | Wang ....................... | H02J 3/38 307/125 |
| 8,264,187 B2 | * | 9/2012 | Laceky ................ | B25J 19/0029 318/568.11 |
| 8,665,599 B2 | * | 3/2014 | Shen ...................... | H02J 7/0045 361/736 |

(Continued)

*Primary Examiner* — Helen Rossoshek
(74) *Attorney, Agent, or Firm* — Muncy, Geissler, Olds & Lowe, PC

(57) ABSTRACT

A power bridge device includes: a power management unit (PMU), which is coupled to an external mobile robot and receives and monitors a battery from a mobile robot, wherein the battery provides a power; a control unit, which is coupled to the PMU and operates according to the power provided by the PMU, wherein when the control unit is waken up by the PMU, the control unit passes a handshake protocol with the mobile robot to obtain a battery control of the mobile robot, the control unit determines whether the battery of the mobile robot is sufficient for device charging according to the PMU; a DC/DC converter, which is coupled to the PMU and the control unit, and converts the power into a required voltage value according to the control unit and outputs a DC power source; and a DC/AC inverter, which is coupled to the PMU and the control unit and converts the power to output an AC power source according to the control unit.

6 Claims, 5 Drawing Sheets

(56) References Cited

U.S. PATENT DOCUMENTS

| | | | | |
|---|---|---|---|---|
| 8,736,228 B1* | 5/2014 | Freed | | H02J 50/90 |
| | | | | 320/115 |
| 8,836,285 B2* | 9/2014 | Yamada | | H02J 7/007 |
| | | | | 320/126 |
| 8,994,276 B2* | 3/2015 | Recker | | H05B 47/195 |
| | | | | 315/160 |
| 9,219,423 B2* | 12/2015 | Lv | | H02M 1/088 |
| 9,269,993 B2* | 2/2016 | Khaitan | | H01M 10/46 |
| 9,492,922 B1 | 11/2016 | Johnson et al. | | |
| 9,660,463 B2* | 5/2017 | Sells | | H02J 7/0045 |
| 9,711,985 B1 | 7/2017 | Johnson et al. | | |
| 9,796,287 B2* | 10/2017 | Wang | | B60L 53/14 |
| 9,862,502 B2* | 1/2018 | Kim | | H02J 7/35 |
| 9,868,409 B2* | 1/2018 | Cook | | B60R 16/03 |
| 10,326,284 B2* | 6/2019 | Long | | H02J 7/00036 |
| 10,985,582 B2* | 4/2021 | Stobbe | | H02J 7/342 |
| 2007/0126401 A1* | 6/2007 | Chen | | H02J 7/0068 |
| | | | | 320/130 |
| 2010/0084208 A1* | 4/2010 | Chen | | B60L 58/34 |
| | | | | 180/65.31 |
| 2011/0121653 A1* | 5/2011 | Hartular | | H02J 7/0068 |
| | | | | 307/66 |
| 2012/0163054 A1* | 6/2012 | Luthi | | H02J 9/005 |
| | | | | 363/126 |
| 2012/0175962 A1* | 7/2012 | Zhan | | H02J 3/381 |
| | | | | 307/82 |
| 2014/0077607 A1* | 3/2014 | Clarke | | H02J 7/0045 |
| | | | | 307/75 |
| 2016/0140911 A1* | 5/2016 | Kim | | G09G 5/10 |
| | | | | 315/160 |
| 2017/0104341 A1* | 4/2017 | Partridge | | H02J 7/0021 |
| 2017/0207700 A1* | 7/2017 | Long | | G01R 19/2513 |
| 2018/0069418 A1* | 3/2018 | Tian | | H02M 7/04 |
| 2019/0386494 A1* | 12/2019 | Tengner | | H02J 7/0013 |
| 2020/0021122 A1* | 1/2020 | Lydon | | B60L 53/16 |
| 2020/0102781 A1* | 4/2020 | Amacker | | H02J 50/90 |
| 2021/0013723 A1* | 1/2021 | Kim | | G01N 21/01 |

* cited by examiner

POWER BRIDGE DEVICE USING MOBILE ROBOT BATTERY

CROSS-REFERENCE TO RELATED APPLICATIONS

This application claims priority of No. 108111172 filed in Taiwan R.O.C. on Mar. 29, 2019 under 35 USC 119, the entire content of which is hereby incorporated by reference.

BACKGROUND OF THE INVENTION

Field of the Invention

The invention relates to a power bridge device, and more particularly to a power bridge device using a mobile robot battery.

Description of the Related Art

With the advancement of technology, mobile robots (e.g., iRobot, Lawn Mowers and the like) become increasingly common at home. The mobile robot stays in the charging or standby mode when not performing the main work (e.g., sweeping, mowing or the like). So, the rechargeable battery of the robot can be used in conjunction with the device of the invention to solve the inconvenience in our life to make the life become more convenient.

When the home charging tool or electronic product needs to be used and the battery is in the low battery level state, the immediate charge is still too late. Alternatively, when the small home appliance needs to be used but the alternating current socket or power extension cord cannot be found, inconvenience still occurs. So, the rechargeable battery of the mobile robot can be converted into the home backup or emergency power to make the future life become further convenient.

BRIEF SUMMARY OF THE INVENTION

The invention is directed to a power bridge device using batteries of various mobile robots.

The invention provides a power bridge device using a mobile robot battery includes: a power management unit (PMU), which is coupled to an external mobile robot and receives and monitors a battery from a mobile robot, wherein the battery provides a power; a control unit, which is coupled to the PMU and operates according to the power provided by the PMU, wherein when the control unit is waken up by the PMU, the control unit passes a handshake protocol with the mobile robot to obtain a battery control of the mobile robot, the control unit determines whether the battery of the mobile robot is sufficient for device charging according to the PMU; a DC/DC converter, which is coupled to the PMU and the control unit, and converts the power into a required voltage value according to the control unit and outputs a DC power source; a DC/AC inverter, which is coupled to the PMU and the control unit and converts the power to output an AC power source according to the control unit.

The invention provides a power bridge device using a mobile robot battery includes: a power delivery (PD) control unit, which is coupled to a universal serial bus (USB) interface, wherein after the PD control unit is connected to a to-be-charged device, a charge configuration is determined through a PD protocol, the charge configuration is a voltage required by the to-be-charged device, and the DC/DC converter is controlled to adjust to a required voltage output level. Then, the power is transmitted to the USB interface through a power switch, so that the PD control unit outputs a more precise voltage and current to the to-be-charged device; wherein when the to-be-charged device is connected to the USB interface, the control unit can determine whether to transmit the power from the power management unit to the DC/DC converter according to a charge request of the to-be-charged device, to output the DC power source to the to-be-charged device.

The invention provides a power bridge device using a mobile robot battery, wherein when the power management unit is not coupled to the external mobile robot, the control unit or the PD control unit is in a standby state or a hibernate state.

The invention provides a bridge method using a mobile robot battery, which includes: receiving a charge request from a to-be-charged device; connecting to a mobile robot and passing a handshake protocol to obtain a battery control of the mobile robot; monitoring a battery according to the battery control, wherein the battery provides a power; determining whether the battery of the mobile robot is sufficient to determine whether a charge is to be performed; and outputting a direct current(DC) or an alternating current (AC) to the to-be-charged device according to the charge request.

DETAILED DESCRIPTION OF THE INVENTION

Figure 1:
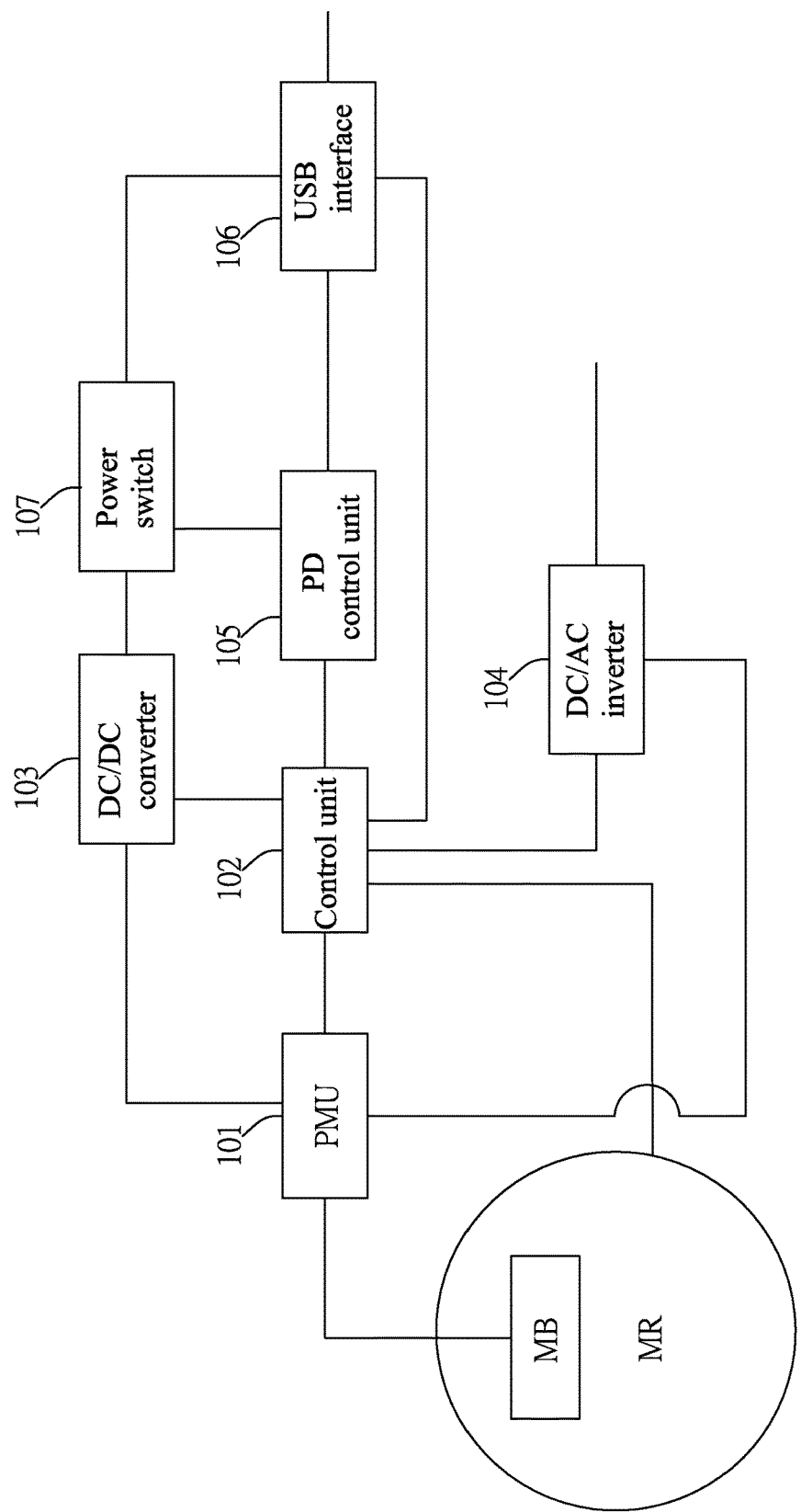
FIG. 1 is a schematic view showing the invention in one embodiment.

Please refer to FIG. 1. FIG. 1 is a schematic view showing the invention in one embodiment. A power bridge device 100 using a mobile robot battery in the invention includes a PMU 101, a control unit 102, a DC/DC converter 103, a DC/AC inverter 104, and a PD control unit 105. The PMU 101 is coupled to an external mobile robot MR, receives a power from a battery MB of the mobile robot and monitors the battery MB, and the battery MB provides the power. The control unit 102 is coupled to the PMU 101, and operates according to the power provided by the PMU 101.

Please note that when the PMU 101 is not coupled to the external mobile robot MR, the control unit 102 or the PD control unit 105 is in a standby state or a hibernate state. When the PMU 101 is coupled to the external mobile robot MR, the control unit 102 or the PD control unit 105 is waken up or enabled by the PMU 101.

When the control unit 102 is waken up by the PMU 101, the control unit 102 reaches an protocol with the mobile robot MR to obtain a battery control right of the mobile robot MR. For example, the control unit 102 passes a handshake protocol with the mobile robot MR in this embodiment to obtain a battery control of the mobile robot MR. Next, the control unit 102 determines whether the internal battery MB of the mobile robot MR is sufficient in order to determine whether a charge is to be performed according to the PMU 101. The DC/DC converter 103 is coupled to the PMU 101 and the control unit 102, and the DC/DC converter 103 converts the power into a required voltage value according to a control signal of the control unit 102 to output a DC power source. The DC/AC inverter 104 is coupled to the PMU 101 and the control unit 102, and the DC/AC inverter 104 converts the power to output an AC power source for users according to the control signal of the control unit 102.

The PD control unit 105 is coupled to a USB interface 106. After the PD control unit 105 is connected to a to-be-charged device (not shown), a charge configuration is determined through the PD communication, and the DC/DC converter 103 is controlled to adjust to a required voltage output level. Then, the power is transmitted to the USB interface 106 through a power switch 107 to output a more precise voltage and current to the to-be-charged device. When the to-be-charged device is connected to the USB interface 106, the control unit 102 determines whether to transmit the power from the PMU 101 to the DC/DC converter 103 according to a charge request because the USB interface 106 is coupled to the control unit 102.

In an embodiment, the charge configuration means that if the maximum charge ability of a charge device is equal to the PD power (PDP) Watts (W), then the chargeable configuration may be the product relationship between a voltage and a current. For example, if the maximum PDP is equal to 45W, then the corresponding rapid charge configuration is 20V@2.25 A or 15V@3 A, . . . ; or if the charge is at the lower Watts, then its charge configuration may be 5V@3 A or 10V@1 A. So, the PD charge of the invention can dynamically adjust the configurations of the voltage and current.

Please note that the power bridge device 100 using the mobile robot battery in the invention may be directed to a mobile robot without the built-in bridge, and the power bridge device 100 is used to make the electric powers of two mobile robots be connected in series and be provided in an accumulated manner, wherein multiple mobile robots also have the similar conditions. In addition, in one embodiment, the power switch 107 may also control whether a voltage bus (VBUS) power is to be provided to the to-be-charged device.

Figure 1A:
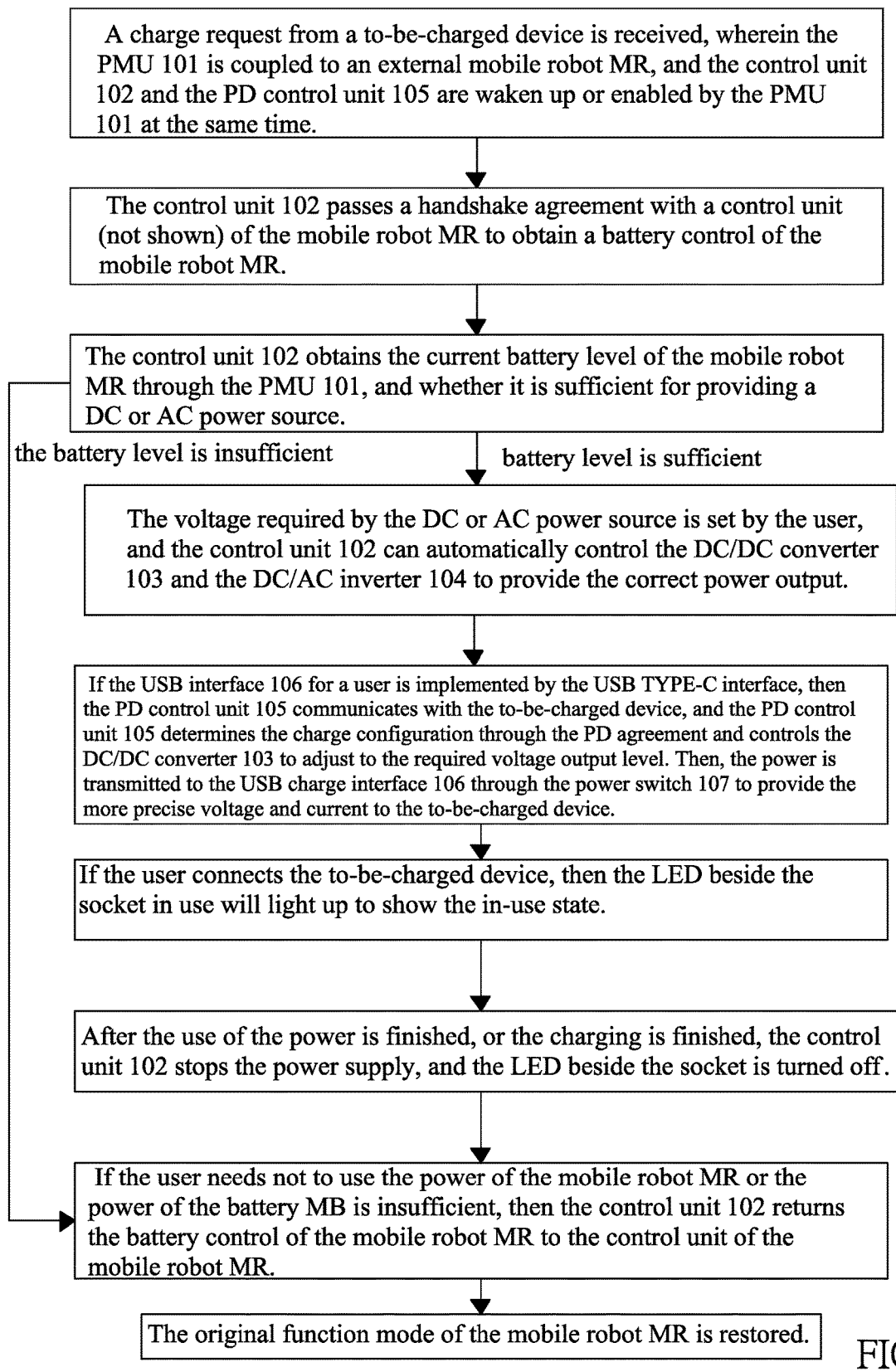
FIG. 1A shows operation steps in one embodiment when the user needs to use the power of the mobile robot MR.

Please refer to FIG. 1A. Operation steps of an embodiment when the user needs to use the power of the mobile robot MR will be explained in detail in the following.

(1) A charge request from a to-be-charged device is received, wherein the PMU 101 is coupled to an external mobile robot MR, and the control unit 102 and the PD control unit 105 are waken up or enabled by the PMU 101 at the same time.

(2) The control unit 102 passes a handshake protocol with a control unit (not shown) of the mobile robot MR to obtain a battery control right of the mobile robot MR.

(3) The control unit 102 obtains the current battery level of the mobile robot MR through the PMU 101, and whether it is sufficient for providing a DC or AC power source. If the battery level is insufficient, then the process jumps to the step (8). If the battery level is sufficient, then the process continues.

(4) The voltage required by the DC or AC power source is set by the user, and the control unit 102 can automatically control the DC/DC converter 103 and the DC/AC inverter 104 to provide the correct power output.

(5) If the USB interface 106 for a user is implemented by the USB TYPE-C interface, then the PD control unit 105 communicates with the to-be-charged device, and the PD control unit 105 determines the charge configuration through the PD protocol and controls the DC/DC converter 103 to adjust to the required voltage output level. Then, the power is transmitted to the USB interface 106 through the power switch 107 to provide the more precise voltage and current to the to-be-charged device.

(6) If the user connects the to-be-charged device, then the LED beside the socket in use will light up to show the in-use state.

(7) After the use of the power is finished, or the charging is finished, the control unit 102 stops the power supply, and the LED beside the socket is turned off.

(8) If the user needs not to use the power of the mobile robot MR or the power of the battery MB is insufficient, then the control unit 102 returns the battery control of the mobile robot MR to the control unit of the mobile robot MR.

(9) The original function mode of the mobile robot MR is restored.

Figure 2:
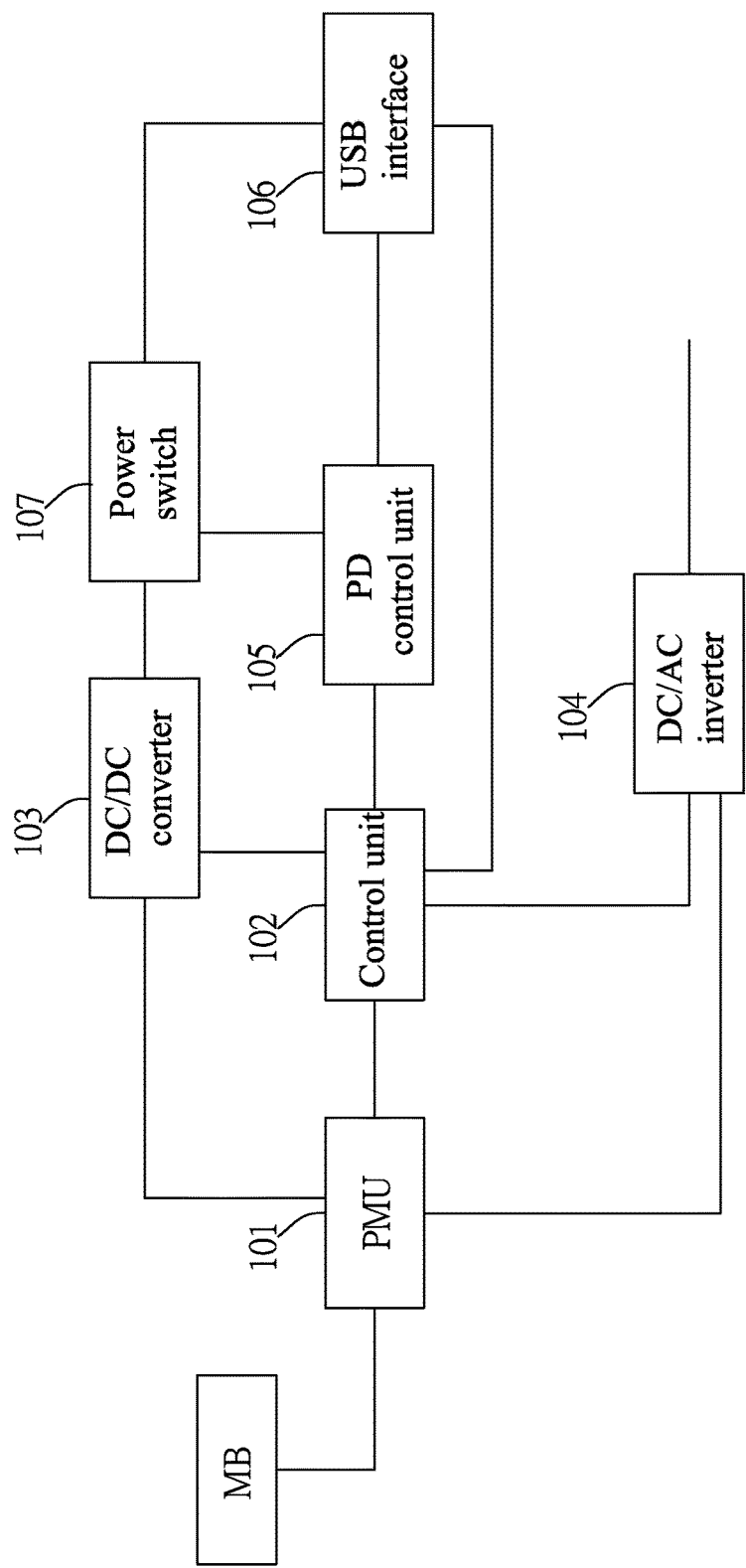
FIG. 2 is a schematic view showing the invention in one embodiment.

Please refer to FIG. 2. FIG. 2 is a schematic view showing the invention in one embodiment. The power bridge devices 200 and 100 using the mobile robot battery differ from each other in that the power bridge device 200 using the mobile robot battery shows that the battery MB is directly connected to the power bridge device 200 of the mobile robot. That is, the battery MB separated from the body of the mobile robot MR is connected to the power bridge device 200 of the mobile robot.

Figure 2A:
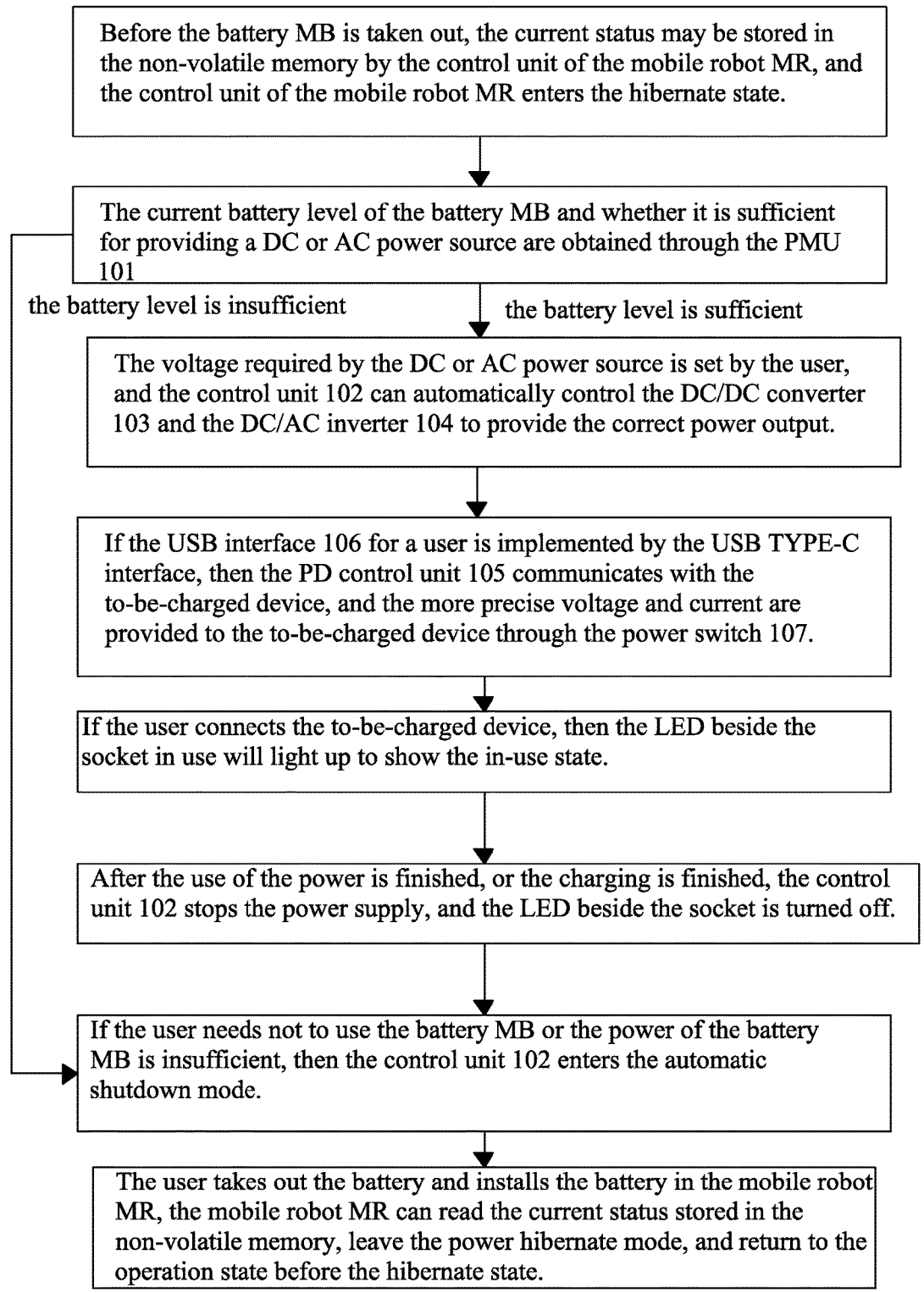
FIG. 2A shows operation steps in one embodiment when the user needs to use the battery MB of the mobile robot MR.

Please also refer to FIG. 2A. In this embodiment, when the user needs to use the battery MB in the mobile robot MR, the following steps are included.

(1) Before the battery MB is taken out, the current status may be stored in the non-volatile memory by the control unit of the mobile robot MR, and the control unit of the mobile robot MR enters the hibernate state.

(2) The current battery level of the battery MB and whether it is sufficient for providing a DC or AC power source are obtained through the PMU 101. If the battery level is insufficient, then the process jumps to the step (7). If the battery level is sufficient, then the process continues.

(3) The voltage required by the DC or AC power source is set by the user, and the control unit 102 can automatically control the DC/DC converter 103 and the DC/AC inverter 104 to provide the correct power output.

(4) If the USB interface 106 for a user is implemented by the USB TYPE-C interface, then the PD control unit 105 communicates with the to-be-charged device, and the more precise voltage and current are provided to the to-be-charged device through the power switch 107.

(5) If the user connects the to-be-charged device, then the LED beside the socket in use will light up to show the in-use state.

(6) After the use of the power is finished, or the charging is finished, the control unit 102 stops the power supply, and the LED beside the socket is turned off.

(7) If the user needs not to use the battery MB or the power of the battery MB is insufficient, then the control unit 102 enters the automatic shutdown mode.

(8) The user takes out the battery and installs the battery in the mobile robot MR, the mobile robot MR can read the current status stored in the non-volatile memory, leave the power hibernate mode, and return to the operation state before the hibernate state.

Figure 3:
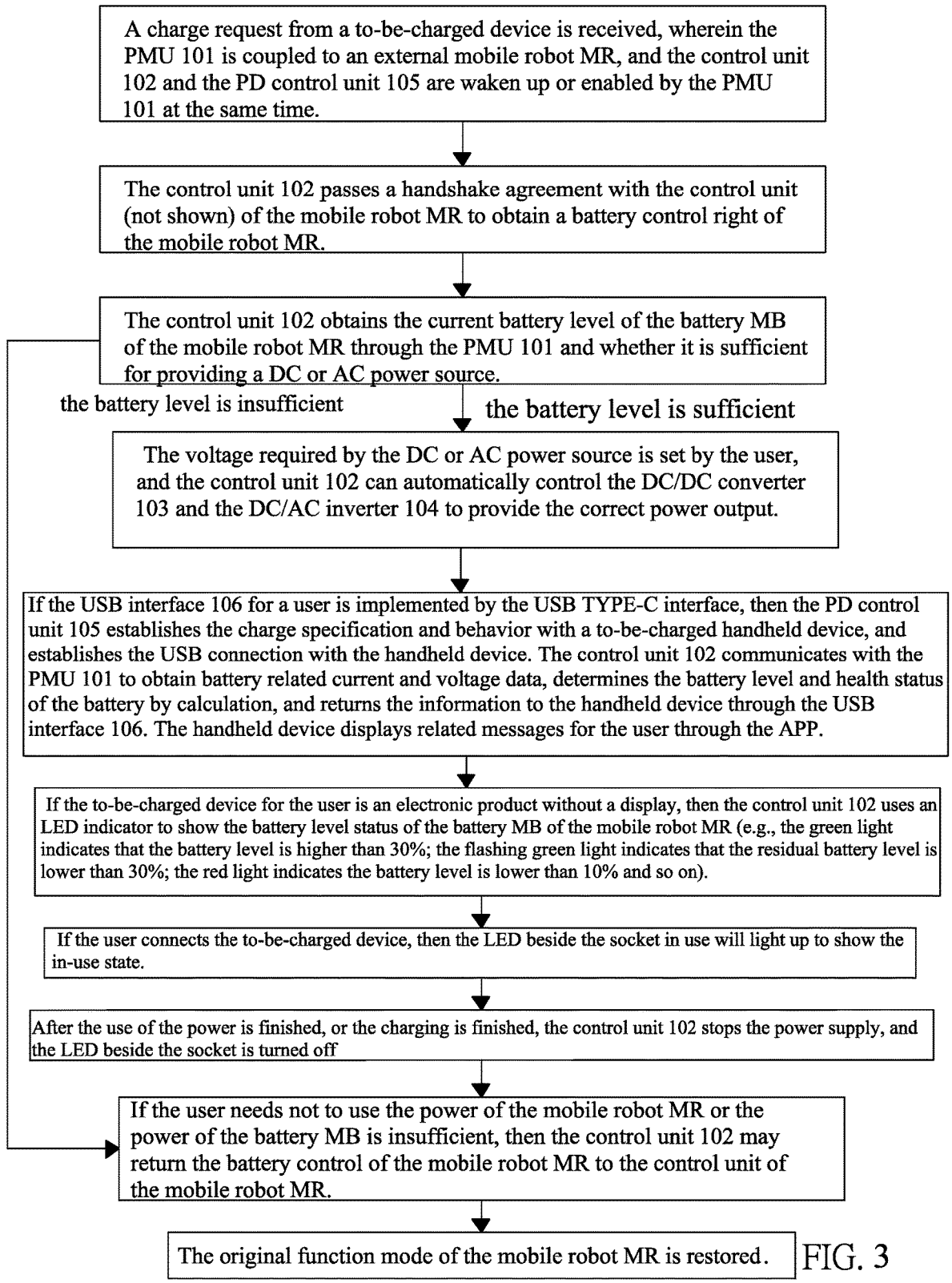
FIG. 3 shows operation steps in one embodiment when the user needs to use the power of the mobile robot MR.

Please refer to FIG. 3. Operation steps of an embodiment when the user needs to use the power of the mobile robot MR will be explained in detail in the following.

(1) A charge request from a to-be-charged device is received, wherein the PMU 101 is coupled to an external mobile robot MR, and the control unit 102 and the PD control unit 105 are waken up or enabled by the PMU 101 at the same time.

(2) The control unit 102 passes a handshake protocol with the control unit (not shown) of the mobile robot MR to obtain a battery control right of the mobile robot MR.

(3) The control unit 102 obtains the current battery level of the battery MB of the mobile robot MR through the PMU 101 and whether it is sufficient for providing a DC or AC power source. If the battery level is insufficient, then the process jumps to the step (8). If the battery level is sufficient, then the process continues.

The voltage required by the DC or AC power source is set by the user, and the control unit 102 can automatically control the DC/DC converter 103 and the DC/AC inverter 104 to provide the correct power output.

(5) If the USB interface 106 for a user is implemented by the USB TYPE-C interface, then the PD control unit 105 establishes the charging specification and behavior with a to-be-charged handheld device, and establishes the USB connection with the handheld device. The control unit 102 communicates with the PMU 101 to obtain battery related current and voltage data, determines the battery level and health status of the battery by calculation, and returns the information to the handheld device through the USB interface 106. The handheld device displays related messages for the user through the APP.

(6) If the to-be-charged device for the user is an electronic product without a display, then the control unit 102 uses an LED indicator to show the battery level status of the battery MB of the mobile robot MR (e.g., the green light indicates that the battery level is higher than 30%; the flashing green light indicates that the residual battery level is lower than 30%; and the red light indicates the battery level is lower than 10% and so on).

(7) If the user connects the to-be-charged device, then the LED beside the socket in use will light up to show the in-use state.

(8) After the use of the power is finished, or the charging is finished, the control unit 102 stops the power supply, and the LED beside the socket is turned off.

(9) If the user needs not to use the power of the mobile robot MR or the power of the battery MB is insufficient, then the control unit 102 returns the battery control right of the mobile robot MR to the control unit of the mobile robot MR.

(10) The original function mode of the mobile robot MR is restored.

In summary, the battery MB of the mobile robot MR is connected to the power bridge device of the invention using the mobile robot battery through the built-in connector. The power bridge device of the invention can provide one or multiple AC power sources, and one or multiple DC power sources (e.g., a battery with 14.8 volts and 6400 mAh), which can be converted into the AC 110V power by the AC inverter, wherein the fan, PC/NB, household sounder or the like can be powered through the AC socket. The DC converter can convert the DC power source into DC 18V/5V power, and the chargeable machine tool or electronic product (e.g., smart mobile phone/tablet computer) can be used through the DC inserting port (USB type-C). Because a mobile power can be used indoors or outdoors, it is unnecessary to find the socket. The electric backup power can be used when the user forgets to charge the chargeable machine tool or electronic product.

What is claimed is:

1. A power bridge device using a mobile robot battery, the power bridge device comprising:
    a power management unit (PMU) coupled to an external mobile robot having a battery, the power management unit monitoring the battery of the mobile robot and receiving a power from the battery;
    a control unit, which is coupled to the power management unit, and operates according to the power provided by the power management unit, wherein when the control unit is waken up by the power management unit, the control unit passes a handshake protocol with the mobile robot to obtain a battery control of the mobile robot, and the control unit determines whether the battery of the mobile robot is sufficient for device charging according to the power management unit;
    a DC/DC converter, which is coupled to the power management unit and the control unit, converts the power into a required voltage value according to the control unit and outputs a DC power source; and
    a DC/AC inverter, which is coupled to the power management unit and the control unit, and converts the power to output an AC power source according to the control unit.

2. The power bridge device according to claim 1, further comprising:
    a power delivery (PD) control unit, which is coupled to a universal serial bus (USB) interface, wherein after the PD control unit is connected to a to-be-charged device, a charge configuration is determined through a PD protocol, the charge configuration is a voltage required by the to-be-charged device, and the power is transmitted to the USB interface through a power switch to output a more precise voltage and current to the to-be-charged device;
    wherein when the to-be-charged device is connected to the USB interface, the control unit can determine whether to transmit the power from the power management unit to the DC/DC converter according to a charge request of the to-be-charged device to output the DC power source to the to-be-charged device because the control unit is coupled to the USB interface.

3. The power bridge device according to claim 2, wherein when the power management unit is not coupled to the external mobile robot, the control unit or the PD control unit is in a standby state or a hibernate state.

4. The power bridge device according to claim 3, wherein the charge request is determined by the power management unit monitoring the handshake protocol of the USB interface.

5. The power bridge device according to claim 4, wherein the power switch controls whether a voltage bus (VBUS) power is to be provided to the to-be-charged device.

6. The power bridge device according to claim 5, wherein, when the power bridge device needs not to charge the to-be-charged device or the power of the battery is insufficient, the control unit returns the battery control to the mobile robot.

* * * * *